(12) United States Patent
Hooper et al.

(10) Patent No.: US 12,436,004 B2
(45) Date of Patent: Oct. 7, 2025

(54) FIBRE OPTIC SENSING (71) Applicant: Optasense Holdings Limited, Camberley (GB)

(72) Inventors: Richard Hooper, Farnborough (GB); Roger Crickmore, Farnborough (GB)

(73) Assignee: Optasense Holdings Limited, Camberley (GB)

( * ) Notice: Subject to any disclaimer, the term of this patent is extended or adjusted under 35 U.S.C. 154(b) by 42 days.

(21) Appl. No.: 18/556,061

(22) PCT Filed: Apr. 25, 2022

(86) PCT No.: PCT/GB2022/051043
§ 371 (c)(1),
(2) Date: Oct. 18, 2023

(87) PCT Pub. No.: WO2022/229616
PCT Pub. Date: Nov. 3, 2022

(65) Prior Publication Data
US 2024/0175727 A1 May 30, 2024

(30) Foreign Application Priority Data
Apr. 28, 2021 (GB) ..................................... 2106046

(51) Int. Cl.
*G01D 5/353* (2006.01)
(52) U.S. Cl.
CPC ................................ *G01D 5/35361* (2013.01)
(58) Field of Classification Search
CPC ............... G01D 5/35358; G01D 5/353; G01D 5/35361; G01H 9/004; G01H 9/00; G01H 9/002; G01K 11/32
See application file for complete search history.

(56) References Cited

U.S. PATENT DOCUMENTS

| | | | |
|---|---|---|---|
| 10,641,649 B1 * | 5/2020 | Butman | H04B 10/6163 |
| 2012/0280117 A1 * | 11/2012 | Lewis | G01D 5/35367 |
| | | | 385/12 |

(Continued)

FOREIGN PATENT DOCUMENTS

| | | |
|---|---|---|
| WO | 2015/170114 | 11/2015 |
| WO | 2020/016556 | 1/2020 |
| WO | 2021/069481 | 4/2021 |

OTHER PUBLICATIONS

Intellectual Property Office, Search Report mailed on Oct. 28, 2021, issued in connection with United Kingdom Patent Application No. GB2106046.2, 3 pages.

(Continued)

*Primary Examiner* — Tarifur R Chowdhury
*Assistant Examiner* — Kaitlyn E Kidwell
(74) *Attorney, Agent, or Firm* — MCDONNELL BOEHNEN HULBERT & BERGHOFF LLP (57) ABSTRACT

This application relates to methods and apparatus for distributed fibre optic sensing. The apparatus includes an optical arrangement configured to generate a local oscillator signal (LO) and also to repeatedly interrogate a sensing optical fibre. Each interrogation comprises at least one pulse of coherent optical radiation at a launch frequency, which differs from that of the local oscillator signal by a carrier frequency. A mixer mixes backscatter signal from the sensing fibre with the local oscillator signal; and a detector arrangement provides at least one corresponding digital detector output signal (DX, DY). A processor processes each digital detector output signal to down-convert the digital detector output signal to a respective baseband signal based for each carrier frequency and convert each baseband signal to a phase signal. The processor is operable to apply time-domain low pass filtering to each baseband signal with (Continued)

a cut-off frequency, which is less than half the interrogation rate.

20 Claims, 3 Drawing Sheets

(56) References Cited

U.S. PATENT DOCUMENTS

| | | | |
|---|---|---|---|
| 2013/0139597 A1* | 6/2013 | Lin | G01H 9/00 |
| | | | 73/584 |
| 2014/0130601 A1* | 5/2014 | Zhou | G01S 15/02 |
| | | | 73/655 |
| 2017/0045410 A1 | 2/2017 | Crickmore et al. | |
| 2019/0025094 A1 | 1/2019 | Lewis et al. | |

OTHER PUBLICATIONS

International Searching Authority, International Search Report and Written Opinion mailed on Jul. 14, 2022, issued in connection with International Patent No. PCT/GB2022/051043, filed Apr. 25, 2022, 13 pages.

* cited by examiner

FIBRE OPTIC SENSING

CROSS-REFERENCE TO RELATED APPLICATIONS

The present application is a national stage entry of PCT/GB2022/051043 filed Apr. 25, 2022, which claims priority to GB 2106046.2 filed on Apr. 28, 2021, the contents of each of which are hereby incorporated by reference.

FIELD OF THE DISCLOSURE

This application relates to methods and apparatus for fibre optic sensing.

BACKGROUND

Distributed fibre optic sensing is a known type of sensing where an optical fibre is deployed as a sensing fibre and interrogated with electromagnetic radiation to provide sensing of environmental stimuli affecting the sensing fibre along its length. By analysing the radiation backscattered from within the sensing fibre, based on the round-trip travel time to different distances into the sensing fibre, the sensing fibre can effectively be divided into a plurality of discrete sensing portions which may be (but do not have to be) contiguous.

One class of distributed fibre optic sensing is based on interrogating the sensing fibre with coherent optical radiation and detecting any of the interrogating radiation which has been Rayleigh backscattered from within the sensing fibre.

The sensing fibre may be repeatedly interrogated, and each interrogation may comprise launching coherent interrogating radiation into a first end of the sensing fibre and detecting the Rayleigh backscatter from that interrogation, i.e. radiation which has been elastically backscattered at the same frequency as the interrogating radiation. As the interrogating radiation propagates in the sensing fibre, it may be backscattered from various scattering sites within the optical fibre, which may be inherent scattering sites that are inherently present in the optical fibre, i.e. not deliberately introduced reflection sites. The backscatter arriving back at the first end of the sensing fibre at any time will include contributions of backscatter from various different scattering sites from a portion of fibre illuminated by the interrogating radiation. As the interrogating radiation is coherent, the backscatter from the different scattering sites will interfere to provide an overall interference signal, which depends on the distribution of the scattering sites within the fibre.

Within each discrete sensing portion of the sensing fibre, disturbances of the fibre, for instance dynamic strains due to incident acoustic waves, can cause a variation in effective optical path length of that section, which results in a variation in the distribution of the scattering sites and hence a variation in the properties of the interference signal.

This variation can be detected and analysed and used to give an indication of disturbance of the fibre at that sensing portion. Such a fibre optic sensor effectively acts as a linear sensing array of sensing portions of optical fibre which are responsive to dynamic disturbances such as strains due to acoustic stimuli, and thus such sensing is often referred to as distributed acoustic sensing (DAS), although the same principles can be applied to detect any stimulus that results in a variation in effective optical path length of the sensing fibre, such as dynamic temperature variations.

One example of a coherent Rayleigh based distributed fibre optic sensor is described in WO2020/016556. The sensor described in WO2020/016556 operates such that each interrogation of a sensing optical fibre involves launching at least two pulses of coherent optical radiation into the sensing fibre, with a delay between the pulses and the pulses having a different optical frequency to one another, such that the backscatter from the individual pulses can be independently demodulated.

The backscatter from the sensing fibre is mixed with a local oscillator at a frequency different to that of each of the interrogation pulses, so as to form a signal component at a respective carrier frequency for each of the interrogating pulses. In some implementations, to avoid issues with polarisation fading, the backscatter may be mixed with the local oscillator at two orthogonal polarisation states, so as to provide polarisation diversity.

A photodetector is used to detect the mixed backscatter/local oscillator signal at a relatively high sample rate. The digital output from the photodetector is then down-converted to baseband for each carrier frequency, and each baseband signal is then independently demodulated. WO202/016556 describes that each baseband signal may be low-pass filtered, with a frequency cut-off so as to leave only the baseband signals corresponding to the relevant carrier frequency, and then a moving average is applied with a spatial width corresponding to half the width of the relevant interrogating pulse. The sample rate of the averaged data may then be reduced, to reduce the downstream processing burden, before determining the absolute angle, and optionally the magnitude, of the complex phasor, e.g. converting the I and Q components to values of phase and optionally amplitude. A spatial difference in phase over a defined gauge length is then determined along the length of the sensing fibre.

A measurement signal indicative of a stimulus acting on a relevant sensing portion can be generated from the phase data for a given sensing portion from repeated interrogations, possibly with diversity processing applied to the signals for the different carriers and/or polarisations, e.g. selecting the relevant data based on the greatest determined carrier amplitude. In addition, a temporal difference in phase can be calculated for a given sensing portion from the two pulses of a given interrogation. This provides an indication of the rate of change of phase over the period of the delay between the pulses, which is less than the interrogation period, and this temporal difference can be integrated to obtain a phase signal that will accurately track large amplitude disturbances that may otherwise overscale between separate interrogations.

The senor described WO2020/016556, as mixing the backscatter with a local oscillator provides effective amplification at the carrier frequency of interest and thus allows for relatively long lengths of sensing fibre to be interrogated, whilst the use of two pulses per interrogation that can be independently demodulated so as to provide a sub-sample indication of rate of change of phase allows a relatively high dynamic range.

When interrogating relatively long sensing fibres, however, the relatively weak backscatter that may be received from further into the sensing fibre can lead to a relatively low carrier-to-noise ratio in the signal at the photodetector, which can lead to errors in the demodulation of the data.

SUMMARY

Embodiments of the present disclosure relate to methods and apparatus for fibre optic distributed acoustic sensing, that may at least mitigate at least some of the above-mentioned issues.

Thus, according to an aspect of the disclosure, there is provided a distributed fibre optic sensing apparatus, comprising an optical arrangement configured to generate a local oscillator signal and also to repeatedly interrogate a sensing optical fibre with interrogations of coherent optical radiation at an interrogation rate, wherein each interrogation comprises at least one optical pulse, the, or each, optical pulse being at a respective launch frequency which differs from a frequency of the local oscillator signal by an amount equal to a respective carrier frequency. A mixer is configured to receive a backscatter signal comprising radiation from the optical pulse which is backscattered from within the sensing optical fibre and to mix the backscatter signal with the local oscillator signal. A detector arrangement is configured to receive the backscatter signal mixed with the local oscillator signal and provide a first corresponding digital detector output signal. A processor is configured to process the first digital detector output signal, wherein the processor is configured, for the or each respective carrier frequency, to down-convert the digital detector output signal to a respective baseband signal based on that carrier frequency and convert the baseband signal to a phase signal. The processor is also operable to apply time-domain low pass filtering to the or each baseband signal with a first cut-off frequency which is less than half the interrogation rate.

In some implementations, the processor may be configured to down-convert the first digital detector output signal to the respective baseband signal by multiplying the digital detector output signal by sine and cosine components at the respective carrier frequency to provide in-phase and quadrature components of the baseband signal. In which case, the processor may be operable to apply said time-domain low pass filtering to the in-phase and quadrature components of the respective baseband signal. In some examples, the processor may be configured to apply said time-domain low pass filtering by forming a time series of the in-phase and quadrature components of the baseband signal and filtering said time series.

In some examples, the processor may be configured to sum the or each respective baseband signal over a distance corresponding to half a length of the at least one interrogation pulse in the sensing optical fibre prior to conversion to the phase signal. The time domain low pass filtering of the respective baseband signal may be applied to the respective baseband signal after such summing.

In some examples, the at least one optical pulse comprises a first optical pulse at a first launch frequency, which differs from the frequency of the local oscillator signal by a first carrier frequency, and a second launch pulse at a second, different, launch frequency, which differs from the frequency of the local oscillator signal by a second carrier frequency. The processor may be configured to down-convert the first digital detector output signal to a first baseband signal by multiplying the digital detector output signal by sine and cosine components at the first carrier frequency to provide in-phase and quadrature components of the first baseband signal and to down-convert the digital detector output signal to the second baseband signal by multiplying the digital detector output signal by sine and cosine components at the second carrier frequency to provide in-phase and quadrature components of the second baseband signal. The processor may be operable to apply the time-domain low pass filtering to the in-phase and quadrature components of the first and second baseband signals prior to conversion to first and second phase signals.

In some examples, the processor may configured such that down-converting the digital detector output signal to the first baseband signal comprises additionally filtering the down-converted digital detector output signal so as to remove substantially any signal components arising from backscatter from the second optical pulse and such that down-converting the digital detector output signal to the second baseband signal comprises additionally filtering the down-converted digital detector output signal so as to remove substantially any signal components arising from backscatter from the first optical pulse.

The processor may be configured to determine, for each of a plurality of sensing portions, first and second spatial phase values as the differential change in phase of the respective first and second phase signals over said sensing portion. The processor may be further configured, for said sensing portions, to determine a temporal difference value as a difference between the first phase value and the second phase value. The processor may be further configured to integrate the determined temporal difference value over time with a scaling factor based on the time delay between the first and second optical pulses as a fraction of an interrogation period between successive interrogations to provide a scaled phase signal. The processor may be further configured to output a measurement signal based on the scaled phase signal.

In some examples, the first launch frequency differs from the second frequency by at least 100 MHz. In some examples, the first launch frequency and the second launch frequency may each differ from the frequency of the local oscillator signal by at least 200 MHz.

In some implementations, the mixer may be further configured to split the backscatter signal into first and second orthogonal polarisation components and to mix each of the first and second polarisation components with a corresponding part of the local oscillator signal to form respective first and second mixed signals. The detector arrangement may be configured to receive the first and second mixed signals and to provide said first digital detector output signal corresponding the first mixed signal and also a second digital detector output signal corresponding the first mixed signal. The processor may be configured to process the second digital detector output signal in the same way as the first digital detector output signal. The processor may be configured to combine data generated from processing the first digital detector output signal and data generated from processing the second digital detector output signal according to a quality metric.

Aspects also relate to a sensing apparatus according to any of the embodiments described herein together with a sensing optical fibre coupled to receive the interrogations of coherent optical radiation from the optical arrangement and to provide the backscatter signal to the mixer.

In another aspect there is provided a method of processing data acquired from a distributed fibre optic sensing apparatus, wherein the data comprises a digital detector output signal from a detector that received a local oscillator signal mixed with backscatter from a sensing optical fibre in response to repeated interrogations of a sensing optical fibre, where each interrogation comprises at least one optical pulse at a respective launch frequency which differs from a frequency of the local oscillator signal by an amount equal to a respective carrier frequency. The method comprises, for the, or each, respective carrier frequency, down-converting the digital detector output signal to a baseband signal based on the relevant carrier frequency and converting the baseband signal to a phase signal. The method comprises applying time-domain low pass filtering to the, or each, baseband signal with a first cut-off of frequency which is less than half the interrogation rate.

In some examples, the at least one optical pulse comprises a first optical pulse at a first launch frequency which differs from the frequency of the local oscillator signal by a first carrier frequency and a second launch pulse at a second, different launch frequency which differs from the frequency of the local oscillator signal by a second carrier frequency. The method may then comprise down-converting the digital detector output signal to a first baseband signal by multiplying the digital detector output signal by sine and cosine components at the first carrier frequency to provide in-phase and quadrature components of the first baseband signal and down-converting the digital detector output signal to a second baseband signal by multiplying the digital detector output signal by sine and cosine components at the second carrier frequency to provide in-phase and quadrature components of the second baseband signal. The time-domain low pass filtering may be applied to the in-phase and quadrature components of the first and second baseband signals. In some examples, down-converting the digital detector output signal to the first baseband signal may comprise additionally filtering the down-converted digital detector output signal so as to remove substantially any signal components arising from backscatter from the second optical pulse and down-converting the digital detector output signal to the second baseband signal may comprise additionally filtering the down-converted digital detector output signal so as to remove substantially any signal components arising from backscatter from the first optical pulse.

The method may further comprise determining, for each of a plurality of sensing portions, first and second spatial phase values as the differential change in phase of the respective first and second phase signals over said sensing portion. The method may also comprise determining, for said sensing portions, a temporal difference value as a difference between the first phase value and the second phase value. In some examples the method may comprise integrating the determined temporal difference value over time with a scaling factor based on the time delay between the first and second optical pulses as a fraction of an interrogation period between successive interrogations to provide a scaled phase signal. The method may also involve outputting a measurement signal based on the scaled phase signal.

The method further comprising interrogating the sensing fibre to provide said digital detector output signal.

Note that unless expressly indicated to the contrary or clearly incompatible, any feature of any of the embodiments described herein may be used in combination with any one or more features of any of the other described embodiments.

BRIEF DESCRIPTION OF THE DRAWINGS

Embodiments, and feature of embodiments of the present disclosure, will now be described by way of example only with respect to the accompanying drawings, of which.

DETAILED DESCRIPTION

Embodiments of the present disclosure relate to methods and apparatus for distributed fibre optic sensing, and in particular to coherent Rayleigh backscatter based distributed fibre optic sensing, such as distributed acoustic sensing (DAS), that can provide quantitative data about stimuli acting on a sensing fibre and which can operate over relatively long sensing ranges.

Embodiments relates to methods and apparatus for distributed fibre optic sensing that may repeatedly interrogate an optical fibre with two or more pulses of coherent optical radiation at different optical frequencies, so as to allow independent demodulation, in a similar manner as described in WO2020/016556. In embodiments of the present disclosure, however, the processing of the detected backscatter data is different to that described in WO2020/016556, e.g. involves additional and/or alternative processing step, which provides improved performance with respect to errors.

Figure 1:
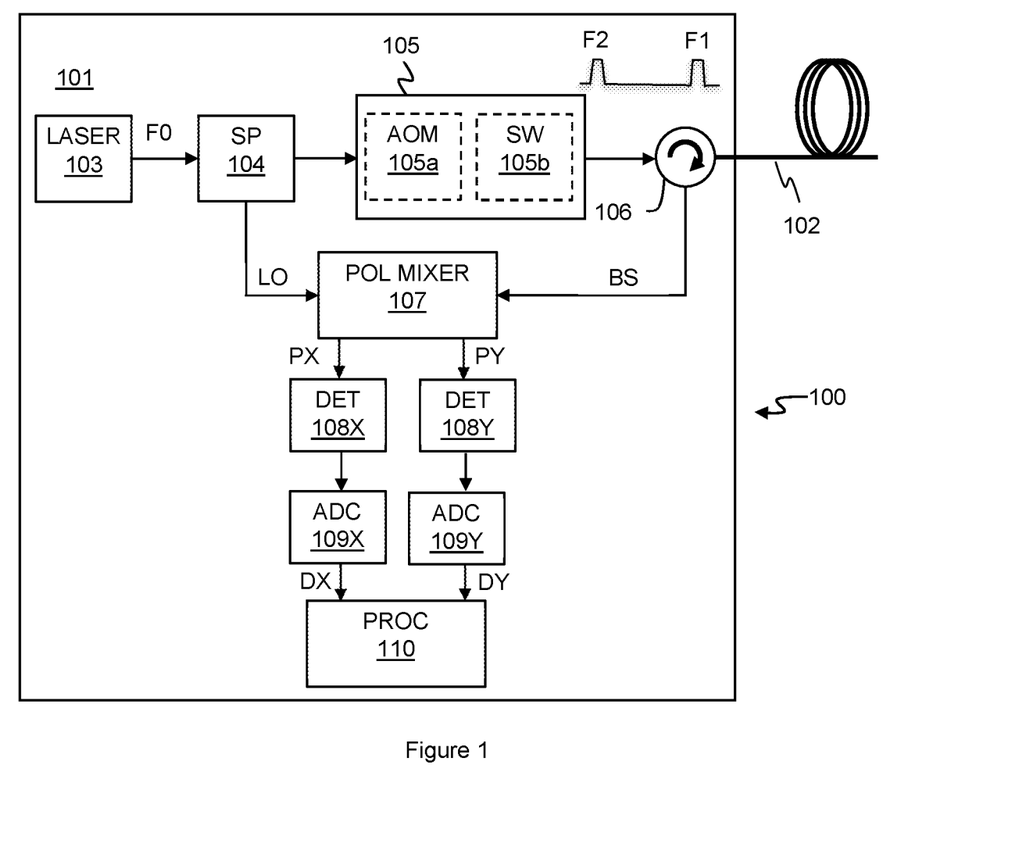
FIG. 1 illustrates a distributed fibre optic sensing system.

FIG. 1 shows a schematic of one example of a coherent Rayleigh distributed fibre optic sensing arrangement 100 suitable for use in embodiments of the disclosure.

The sensing system 100 includes an interrogator unit 101 for interrogating a sensing optical fibre 102. In use the sensing optical fibre 102 may be removably connected to the interrogator unit 101, either directly or via some intermediate optical connection, such as an intermediate length of optical fibre (not shown in FIG. 1).

The sensing optical fibre 102 may be an optical fibre such as would routinely be used for telecommunication applications, e.g. some conventional single mode optical fibre, although in some implementations a multimode fibre could be used as the sensing fibre, albeit with a possible reduction in performance. The sensing optical fibre 102 may be substantially unmodified and thus may be substantially free of any deliberately introduced reflection or scattering sites such as fibre Bragg gratings (FBGs) or the like, at least over a significant length of the sensing optical fibre which is used for sensing. In some applications, however, the sensing optical fibre may be an optical fibre of a fibre optic cable structure that has been specifically designed to be responsive to certain stimuli or to have a tuned sensitivity response, e.g. to improve the sensitivity to at least some acoustic signals.

In use, the sensing optical fibre 102 may be deployed in an area or location of interest which it is wished to monitor. In some applications the sensing optical fibre 102 may be deployed in a location of interest in a relatively permanent manner, for instance at least part of the sensing optical fibre 102 may be buried in the ground in a defined pattern in an area or to follow a defined path. Additionally or alternatively at least part of the sensing optical fibre 102 could be embedded in a structure. In some instances, the sensing optical fibre may be an optical fibre already present in a location, e.g. previously installed for some other purpose such as for communication.

The interrogator unit 101 is configured to, in use, repeatedly interrogate the sensing optical fibre 102 with interrogating radiation. Each interrogation involves launching at least one interrogating pulse of coherent optical radiation, and advantageously at least two temporally separated pulses, into the sensing optical fibre and receiving optical backscatter from the sensing optical fibre following the pulse launch. The received backscatter signal is mixed with a local oscillator signal, where there is a controlled frequency difference between the frequency of an interrogating pulse and the frequency of the local oscillator.

FIG. 1 illustrates that the interrogator unit 101 has an optical source, in this case a laser 103, to generate an optical signal at a source frequency F0. The output from the laser 103 is received by a beam splitter 104 that splits the laser output into an output path and also a local oscillator path to provide a local oscillator signal LO. The signal in the output path is input to a modulator 105 which modulates the laser output to provide defined interrogating pulses of optical radiation. In the example of FIG. 1, the modulator 105 is configured to impart a frequency shift to each interrogating pulse from the source frequency F0 of the local oscillator signal. The modulator 105 may comprise at least one acousto-optic modulator (AOM) 105*a* for imparting a frequency shift to the radiation in the output path, which is gated, so as to form the interrogating pulses. The modulator 105 may thus comprise one or more elements, such as AOM 105*a*, for providing a frequency shift. In some examples, at least some of the elements used to provide a frequency shift may also be used to define the pulses of the interrogating radiation, e.g. to define the start and end of the pulse. In some instances however one or more components such as an AOM 105*a* may be used to impart frequency shifting and there may be at least one additional component, such as an optical switch 105*b* for example, to provide gating to define the interrogating pulses, e.g. to define the start and end of the pulse.

In some implementations, there may be more than one AOM 105*a*, for instance a first AOM could be arranged to provide a first frequency shift, with at least a second AOM arranged to provide a second frequency shift, which could be a shift in the same direction or opposite direction (e.g. up or down) as the first frequency shift, so as to provide an overall desired frequency shift. For instance, in some embodiments a first AOM could provide a first frequency shift, which may provide the majority of desired frequency shift. The frequency shifted signal may be amplified, which may add some amplified spontaneous emission (ASE) noise, which may be undesirable, especially when interrogating long fibres. A second AOM, e.g. an AOM with a low insertion loss, may, in some embodiments, be usefully used to block at least some of the ASE noise and may provide a second frequency shift, with the first and second frequency shifts collectively providing the overall desired frequency shift. In one example a first AOM may provide a frequency upshift of a few hundred MHz and a second AOM with a low insertion loss may provide a frequency downshift of a few tens of MHz. Alternatively other methods of producing a frequency shift such as an electro-optic modulator (EOM) might be used.

It will, of course, be appreciated that at least some of the frequency shift between the launched interrogating radiation and the local oscillator LO could additionally or alternatively be introduced by a frequency shift applied by a modulator in the local oscillator path. In general therefore the interrogator unit includes an optical arrangement for generating the interrogating radiation and the local oscillator signal. In the example of FIG. 1 the optical arrangement comprises the laser 103, splitter 104 and modulator 105.

The frequency shift introduced between the local oscillator LO and an interrogating pulse is chosen to provide a measurable carrier signal at a desired frequency when the backscatter signal BS is mixed with the LO signal. In some embodiments the frequency difference between an interrogating pulse and the local oscillator LO may be in the range of about 200 MHz to 400 MHz.

In the example of FIG. 1 the modulator 105 is configured to repeatedly generate a first pulse at a first launch frequency F1 and at least a second temporally separated pulse at a second launch frequency F2, different to the first frequency F1. In other words each interrogation of the sensing optical fibre 102 can be seen as comprising a first pulse at frequency F1 followed later by the second pulse at frequency F2.

The difference between the first frequency F1 and the second frequency F2 is selected to be sufficiently large so as to allow the backscatter from each individual interrogating pulse to be demodulated independently and with an acceptable bandwidth. For instance, in some examples, the frequency difference between the first and second interrogating pulses, i.e. between frequencies F1 and F2, may be at least 80 MHz and may, for example, be of the order of about 100 MHz.

Thus, for example, the modulator 105 may be configured to produce a first interrogating pulse at a frequency F1 having a frequency shift from the local oscillator signal LO of the order of 250 MHz and a second interrogating pulse at a frequency F2 having a frequency shift from the local oscillator signal LO of the order of 350 MHz.

The repetition rate of interrogations of the optical fibre, sometimes referred to as the ping-rate, is set with regard to the maximum expected round trip-travel time in the sensing optical fibre, so as to allow time for radiation of a pulse of one frequency, for example the first frequency F1, to travel to the maximum sensing extent of the sensing optical fibre and back again before another pulse of the same frequency, e.g. F1, is launched into the sensing optical fibre. The maximum sensing extent may be the distal end of the sensing optical fibre or a distance into the sensing optical fibre beyond which no significant backscatter would be expected back at the proximal end of the fibre connected to the interrogator unit 101. This limitation on the ping-rate ensures that any radiation at a given frequency, F1 or F2, received at the detector can only have originated from a given interrogating pulse. Were pulses of the same frequency launched into the sensing optical fibre more frequently than this, backscatter from pulses at a launch frequency F1 from two different interrogations would arrive at the detector at the same time, and it would not be possible to discriminate between the backscatter from the two interrogations.

Thus, for example, for a sensing optical fibre of 25 km in length, the maximum round trip travel distance within the sensing optical fibre is 50 km. Assuming a refractive index for the sensing fibre of n=1.5, the round-trip travel time would be expected to be about 0.25 ms. Thus the ping rate may be controlled to be no greater than 4 kHz.

In embodiments of the present disclosure, the measurement signals of interest are the carrier signals due to interference of the backscatter from one interrogating pulse and the local oscillator. Thus the sensor system 100 is designed such that each interrogating pulse results in a separate carrier signal of interest when mixed with the local oscillator. As noted above the first and second interrogating pulses have a frequency difference from one another which is sufficient such that these first and second carrier signals can be independently demodulated. Thus, the first and second interrogating pulses allow for sub-sample measurements and can improve the dynamic range of DAS sensor. It will of course be understood that this principle could be extended to provide more than two independent carrier signals provided that the carrier signals can be independently demodulated.

This is quite different to other known pulse-pair interrogation techniques, in which the carrier signal of interest arises due to interference between the backscatter from the two pulses in the pair. In such other systems, the signal of interest arises from backscatter from the first pulse interfering with backscatter from the second pulse and thus the backscatter from both pulses must be processed together. In that case, the backscatter from a pulse pair of an interrogation provides a single sample of the DAS sensor for each channel and, in such a sensor, the time separation between the pulses in the pair defines the gauge length of the sensor, i.e. the minimum spatial resolution of the sensor. The delay between the pulses is thus typically very short to define an acceptable gauge length, say of the order of 100 ns or less to provide a gauge length of about 10 m or less.

By contrast, in embodiments of the present disclosure, the backscatter from the first and second interrogating pulses are used to provide separate sub-samples of any phase change. That is, there is a first signal of interest due to the backscatter from the first pulse interfering with the local oscillator LO and this signal of interest is processed independently of any contribution from the second pulse. The interference of the backscatter from the second pulse with the local oscillator LO provides a second signal of interest, that represents a sub-sample between repeated interrogations. The delay between the first interrogating pulse and the second interrogating pulse may thus be selected to provide any sub-sample period. As will be described in more detail below the extent of any phase change between the first and second interrogation pulses can be used to provide an indication of the rate of change of phase and hence amplitude. The delay period may be chosen based on a desired maximum amplitude such that a signal at that desired maximum amplitude will not have changed by more than $\pi$ radians in the sub-sample period. The interrogation period, P, between repeatedly launches of a pulse of the same frequency (i.e. 1/ping-rate) may be set as described above based on the maximum round-trip travel time, e.g. 0.25 ms in the example for a km sensing optical fibre. The delay between the first and second interrogating pulses may be any desired fraction of this interrogation period, P.

The first and second interrogating pulses are launched into the sensing optical fibre 102 via circulator 106 and the backscatter signal BS received back from the sensing optical fibre 102 is directed by circulator 106 to mixer 107 where it is mixed with the local oscillator signal LO.

Mixing the backscatter signal BS with the local oscillator signal LO will generate a carrier signal component at the frequency difference between the frequency of the relevant interrogating pulse, i.e. F1 or F2, and the frequency of the local oscillator signal, i.e. F0. This will result in a first carrier signal at the frequency difference between the first interrogating pulse and the local oscillator, i.e. |F1−F0|, e.g. 250 MHz in the example discussed above, and a second carrier signal at the frequency difference between the second interrogating pulse and the local oscillator, i.e. |F2−F0|, e.g. 350 MHz in the example discussed above.

It will be appreciated that the mixing of the backscatter signal and local oscillator signal to produce the carrier signal in this way, effectively provides amplification of the signal component of interest from the backscatter signal in the resultant mixed signal. It will be understood that there will also be a backscatter signal component that does result from interference between the backscatter from the two interrogating pulses, i.e. a signal component at a frequency of |F1−F2|. Such a signal component will be relatively weak however and the local-oscillator scaling amplification means that the carrier signal due to the interference of each pulse with the local oscillator signal LO will dominate.

It will be understood that the backscatter signal component arising from a given one of the interrogating pulses will result from radiation that will have travelled a certain distance into the sensing optical fibre, before being scattered, and then will have travelled back to the start of the fibre. This round-trip propagation within the fibre may have imparted a change in polarisation state of the radiation, compared to the polarisation state of the local oscillator signal LO. The polarisation state of a component of the backscatter signal BS may therefore change over time as the backscatter component is received from different distances into the fibre. It will be appreciated that if the backscatter signal component from one of the interrogating pulses were, at any time, to be in a polarisation state that is orthogonal to that of the local oscillator signal LO, then no signal mixing would occur between that backscatter component and the local oscillator signal at that time and the relevant carrier signal would be in a polarisation faded state. To avoid this fading problem, the mixer 107 may be a dual-polarisation mixer which mixes the local oscillator signal LO and backscatter signal BS in two different polarisation states. For example, the dual-polarisation mixer 107 may receive the local oscillator signal LO and derive two versions of the local oscillator signal at different polarisations, e.g. orthogonal polarisation states X and Y, which are then each mixed separately with the received backscatter signal BS to provide two mixed signals PX and PY. If a particular component of the backscatter signal BS has a polarisation state such that the relevant carrier signal is in a faded state in one mixed signal, e.g. PX, the relevant component will mix with the local oscillator signal in the other polarisation state and so the relevant carrier signal will not be a faded state in the other mixed signal, e.g. PY.

The mixed signals PX and PY may be supplied to respective detectors 108X and 108Y, which may comprise balanced detectors, and the outputs of the respective detectors 108X and 108Y may be sampled at a relatively fast rate by respective ADCs 109X and 109Y. The resulting digital detector output signals DX and DY are processed by processor 110.

Each digital signal DX and DY thus contains backscatter components from both the first and second interrogating pulses and thus, unless complete polarisation fading has occurred in that channel, will have signal components at the first and second carrier frequencies. The digital signals DX and DY for each polarisation channel may thus be processed in substantially the same way so as to provide data for each carrier signal for each polarisation channel. Data from each polarisation channel for each of the first and second carrier signals may then be combined using a polarisation diversity processing scheme to overcome any fading in one of the polarisation channels and use the best available data from the two polarisation channels.

Each digital detector output signal, DX and DY, may therefore be processed in generally the same way.

Figure 2:
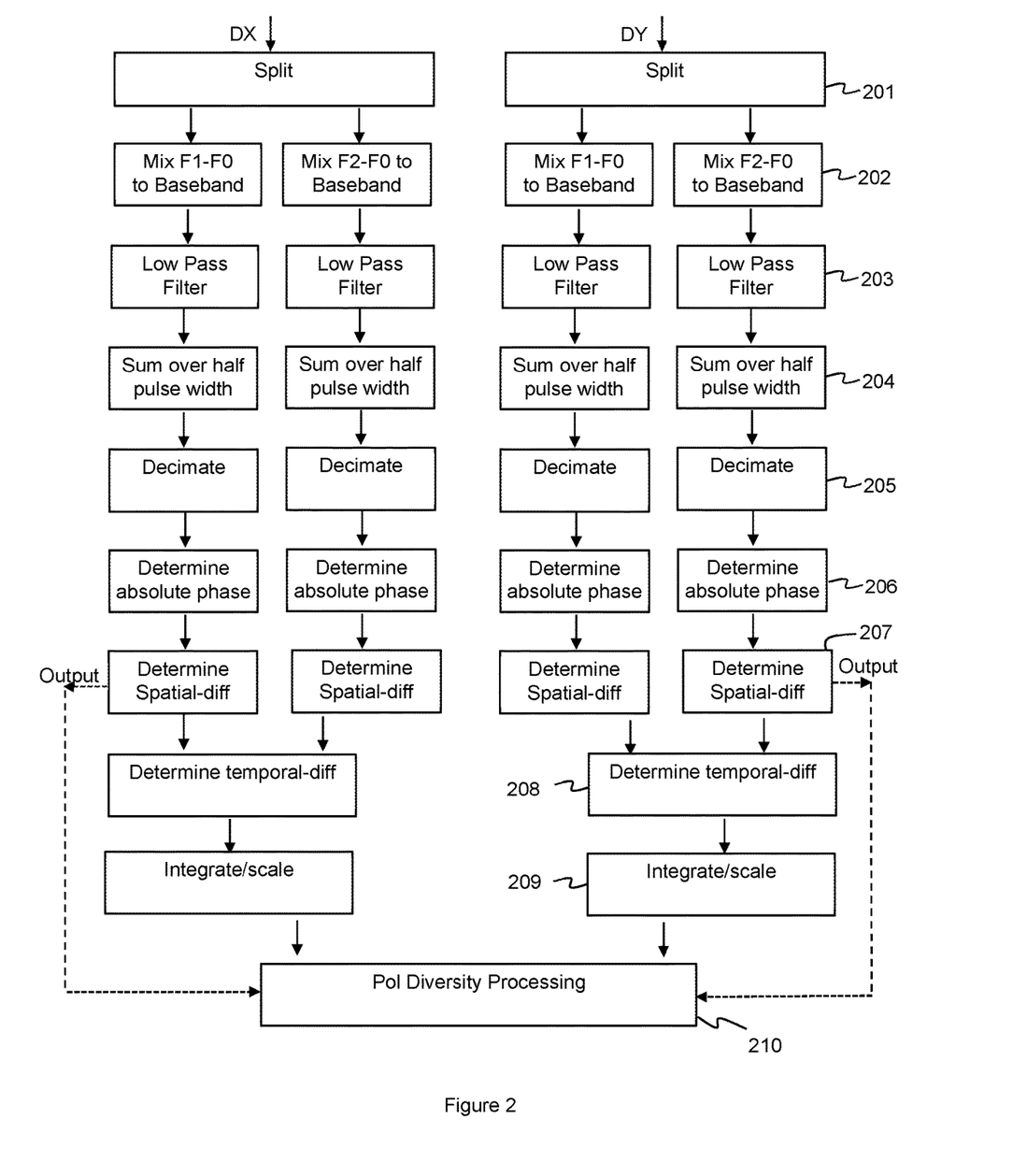
FIG. 2 illustrates a processing flow as described in WO202/016556.
Figure 3:
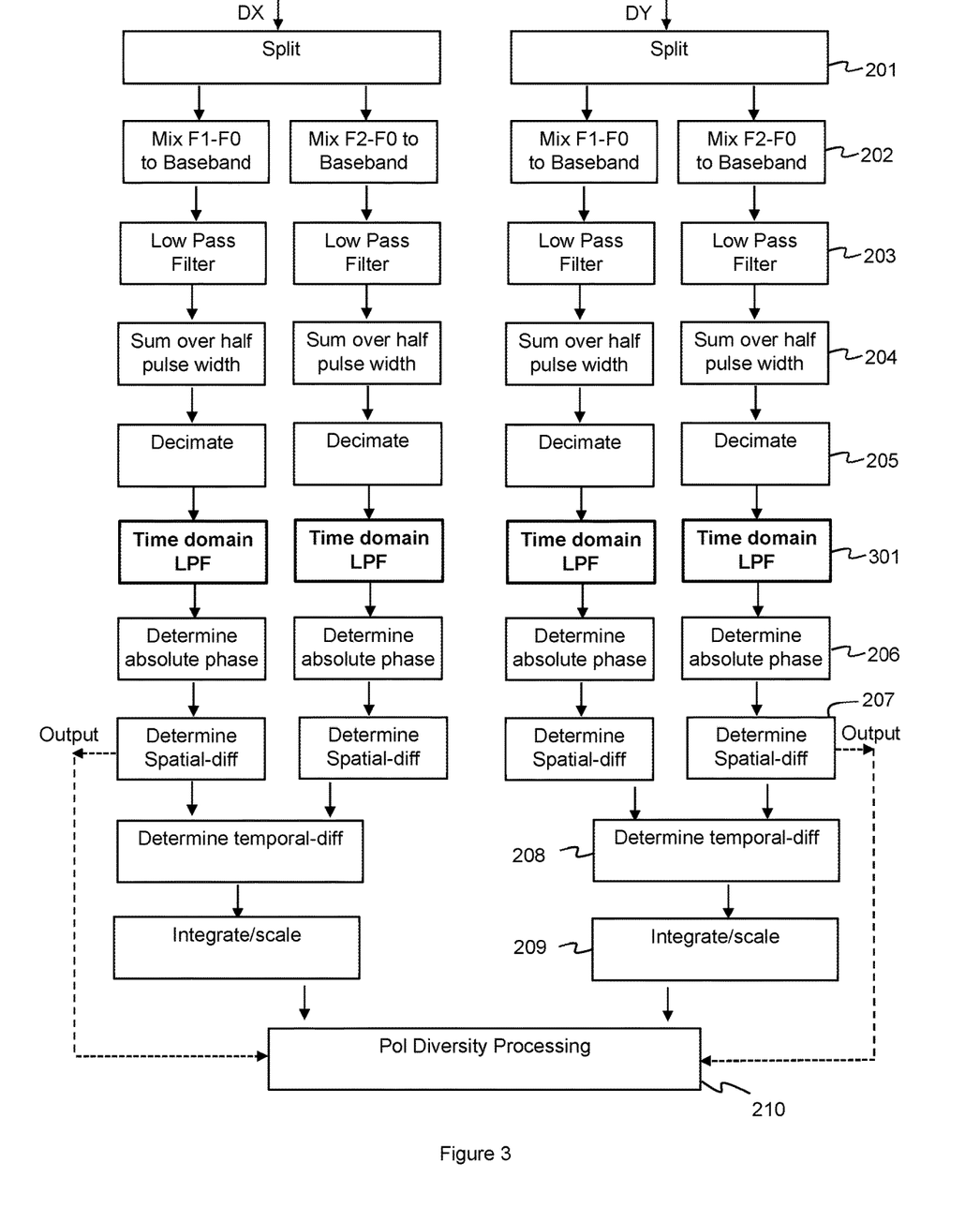
FIG. 3 illustrates a processing flow according to an embodiment.

An example of a known processing flow, such as described in WO2020/016556, is illustrated in FIG. 2. An example of the processing according to embodiments of the present invention is illustrated in FIG. 3.

The known processing as described in WO2020/016556 and illustrated in FIG. 2 will be discussed first.

The digital data DX and DY is split (201) respectively into two data streams for the first and second carrier signals respectively. Each of the first and second data streams for each polarisation channel is then downconverted (202) to baseband, e.g. down-mixed. The first data stream is down-mixed to a baseband signal, based on the frequency of the first carrier signal |F1−F0|, e.g. 250 MHz in the example discussed above with respect to FIG. 1. The second data stream is down-mixed to a baseband signal based on the frequency of the second carrier signal |F2−F0|, e.g. 350 MHz in the example discussed above. In at least some implementations the down-mixing may comprise multiplying the digital signal by sine and cosine components at the relevant carrier frequency to provide in-phase and quadrature components.

Each of the down-mixed baseband signals are then low-pass filtered (203), with a frequency cut-off so as to leave only the baseband signals corresponding to the first and second carrier signals respectively, i.e. so the first baseband signal is filtered to remove substantially any signal components arising from backscatter from the second optical pulse and the second baseband signal is filtered to remove substantially any signal components arising from backscatter from the first optical pulse.

The separation between the frequencies F1 and F2 of the first and second interrogation pulses is set to be high enough so that the two carrier signals can be independently demodulated and processed to provide a desired spatial resolution. A relatively high spatial resolution, say 0.5 m, would correspond to a pulse having a spatial length of 1 m in the sensing optical fibre. Such a pulse would have a period, t, of the order of 10 ns (for an optical fibre with a refractive index around n=1.5). The spectral frequency content of such a pulse is effectively 1/t, so the 0.5 m resolution corresponds to frequency content of about 100 MHz.

Thus a frequency separation of about 100 MHz between the first and second interrogation pulses would be sufficient frequency separation of the respective first and second carrier signals to enable the carrier signals to be independently demodulated and provide a 0.5 m spatial resolution, as described in WO2020/016556. For example, if the frequency of the first carrier signal were 250 MHz, with spectral content 250 MHz±50 MHz, and the frequency of the second carrier signal were 350 MHz, with spectral content 250 MHz±50 MHz, the relevant spectral content can be down-mixed to baseband and after down-mixing each baseband signal can be low-pass filtered with a cut-off frequency, in this example, of about 50 MHz to leave a baseband signal correspond just to the spectral content of the relevant carrier which is sufficient to provide the desired spatial resolution.

It will be understood that to preserve the relevant spectral content of the carrier signals the bandwidth of the detectors 108X and 108Y and sample rate of the ADCs 109X and 109Y must be sufficient for the highest expected signal content of interest. In this example the maximum frequency content of interest is at 400 MHz (i.e. 350 MHz+50 MHz) which thus requires a detector bandwidth of at least 400 MHz and an ADC sample rate of at least 800 MHZ. In some implementations the ADCs 109X and 109Y may be implemented to sample at a rate of around 1 GHz to ensure the system has sufficient bandwidth.

Referring back to FIG. 2, the filtered data may be summed (204) over a distance corresponding to half the spatial length of the interrogating pulse in the sensing optical fibre, which, as described in WO2020/016556, corresponds to physical minimum spatial resolution of the data, as would be understood by one skilled in the art.

The sample rate of the summed data may then be reduced (205) to reduce the downstream processing requirements. Whilst a high sample rate for the ADCs is required for the carrier signals prior to down-conversion, once the signals have been down-mixed to baseband the sample rate may be reduced. As the baseband signals have been filtered with a cut-off frequency of, say 50 MHz in this example, the sample rate may be reduced to a sample rate of 100 MHz.

The reduced sample rate data may then be processed to determine (206) the absolute angle of the complex baseband phasor, i.e. the phase between the local oscillator signal and the backscatter component from the relevant interrogating pulse. There are various ways in which the baseband signal may be processed to determine the absolute phase angle of the complex phasor as would be understood by one skilled in the art. In some embodiments the magnitude, i.e. amplitude, of the phasor may also be determined to be used as a quality metric in downstream processing, e.g. for selection of signals having the largest phasor magnitude.

This provides, for each carrier signal, an indication of absolute phase angle as a function of position along the fibre for a given interrogation, $\phi(z)$ (where z is distance along the sensing optical fibre).

A spatial-differential in phase $\delta\phi(z)$ over a defined gauge length L then is then calculated (207) along the length of the fibre, i.e. $\delta\phi(z)=\phi(z)-\phi(z-L)$ for each carrier signal channel. The defined gauge length L may be any desired gauge length that is greater than or equal to the maximum spatial resolution of the system, e.g. a minimum gauge length of 1 m for the example discussed above with a frequency separation between the first and second carriers of 100 MHz. Thus, for example, a defined gauge length L in the range of 1 m-50 m say may be selected depending on the particular use case at the time. The defined gauge length of the system according to embodiments of the disclosure is thus arbitrary and defined in processing and, if desired, a plurality of different gauge lengths could be processed in parallel. Using the spatial-differential of phase thus provides an indication of the change of phase over that spatial section of the sensing fibre and hence an indication of any stimuli acting on just that portion of the sensing fibre.

For each location along the length of the sensing optical fibre a temporal-differential in phase $\Delta\delta\phi(z, t)$ is determined (208) as difference between the spatial-differential in phase determined from the first carrier signal, for the first interrogation pulse as a time t1 and the spatial-differential in phase determined from the second carrier signal, for the second interrogation pulse as a later time t2, i.e. $\Delta\delta\phi(z, t)=\delta\phi(z, t1)-\delta\phi(z, t2)$.

This temporal-differential in phase $\Delta\delta\phi(z, t)$ provides an indication of the rate of change of the phase at a given location and hence an indication as to whether the amplitude of the phase change between subsequent interrogations is likely to exceed IT radians. In some instances the temporal-differential in phase may be output from the interrogator unit for downstream processing, for instance to indicate the possibility of overscale signals for one or more sensing channels of the DAS sensor.

In some implementations, the temporal-differential in phase may be scaled (209) by the ratio of the delay between the first and second interrogating pulses $\Delta t$ to the interrogation period P to give the change in phase $\delta\phi_P(z,t)$ that would occur between the two interrogation pulses, i.e. $\delta\phi_P(z,t)=\Delta\delta\phi(z, t)/\Delta t \cdot P$. This term could then be integrated over time to give the phase signal induced over the specified section of fibre.

This differential phase signal may be used to provide a recovered signal of interest. Diversity processing (210) may be applied at this stage so as to select the best data for various sensing portions of the optical fibre, i.e. output channels of the distributed fibre optic sensing system, based on quality metrics applied to the data for the two polarisation diverse processing channels. The diversity processing may select data based on a best magnitude basis calculated based on an absolute magnitude of the phasor calculated at step 206 for the two different carrier signals for each polarisation channel. Additionally or alternatively at least some diversity processing may be applied at earlier stage of the process flow.

In the case where overscale is not expected to occur, it is possible to assume that the two carrier signals make an independent measurement of the phase at the same time and so diversity processing can be applied between them as well. In this case, there are four measurements of phase at each time (i.e. the two polarisation states for each of the two carrier signals) all of which could be combined in the same diversity process.

In this way the output of the output of processor 110 of the interrogator unit 101 can be used to provide a phase signal that can be used to provide a quantitative indication of an acoustic signal, or other disturbance leading to a variation in optical path length, acting on a sensing portion of the sensing optical fibre. The evolution of the phase signal over repeated interrogations at a suitable ping-rate can be used to provide tracking of the incident acoustic signal with the sub-sample interval provided by a second interrogation pulse delayed from a first interrogation pulse by a fraction of the interrogation period can be used to scale the phase signal appropriately to accurately track large amplitude signals that may otherwise overscale between separate interrogations.

The processing described in WO2020/016556, as discussed above, allows for a determination of absolute phase, and how it varies for a sensing portion over time due to environmental stimuli acting on that portion of a sensing fibre. As the amount of change in phase varies with a change in effective optical path length of the relevant sensing portion, this provides quantitative data about stimuli acting on the sensing fibre.

The mixing of the backscatter signal with a local oscillator provides amplification of the components of interest in the backscatter signal, allowing for relatively long lengths of sensing fibre to be interrogated, and the sub-sampling provided by two pulses improves dynamic range.

However, in some cases, the carrier-to-signal ratio for sensing portions relatively far into the sensing fibre may be relatively low, which can lead to errors in demodulation, in particular to $2\pi$ phase errors.

Embodiments of the present disclosure thus relate to modified processing to improve error performance. In embodiments of the present disclosure additional processing is applied to the baseband signals prior to conversion to phase and amplitude, i.e. before determining the absolute angle and magnitude of the complex baseband phasor, so as to reduce the number of phase errors.

In particular the baseband signals, e.g. the I and Q components, may be low-pass filtered in the time-domain formed by effectively concatenating the I and Q values for a particular section of the fibre in subsequent ping periods, which therefore has a sampling rate equal to the ping rate. That is, the baseband signals for each portion of the sensing fibre are filtered in the time domain corresponding to successive interrogations of the fibre. The filter applied will have a frequency cut-off which is lower than the half the ping rate. This, in effect, provides some time-domain averaging which results in a greater carrier-to-noise ratio than would otherwise be the case.

It will be appreciated, however, that applying such low-pass filtering with a cut-off frequency which is lower than half the ping rate will limit the bandwidth of the measurement signals that can be monitored, e.g. the acoustic bandwidth for a DAS implementation for monitoring for acoustic stimuli.

As discussed above, the ping-rate (or rate of successive interrogations) defines the effective sample rate of the fibre optic distributed sensor. Thus, due to the Nyquist limit, the maximum frequency content in stimuli affecting the sensing portion that could be reliably detected would be equal to half the ping rate. For instance, as discussed above, for a sensing fibre of 25 km in length, the ping-rate may be set to be no greater than 4 kHz and thus stimuli could be detected with a frequency up to 2 kHz in that example. In the processing described with reference to FIG. 2, all of the frequency content up to this limit is preserved.

In embodiments of the present disclosure, however, time domain filtering is applied with a cut-off frequency which is less than half the ping rate. This, in effect, reduces the bandwidth of the distributed fibre optic sensor system for the measurement signal of interest, e.g. the acoustic bandwidth for DAS. For instance, for the example above with a ping rate of 4 kHz, if the baseband data were low-pass filtered in the time-domain with a frequency cut-off below 2 kHz, say at 1 KHz, this would reduce the bandwidth accordingly, but the filtering, in effect provides some averaging that increases the carrier-to-noise ratio and hence can reduce the number of errors in the conversion to phase. This effectively increases the range from which signals within an acceptable error rate may be obtained, i.e. the same performance, in terms of the number of errors, may be obtained from distances further along the sensing fibre.

Thus, it can be seen that there can be a trade-off between measurement signal bandwidth and range. For example, halving the measurement signal bandwidth, e.g. acoustic bandwidth, can increase the carrier-to-noise by 3 dB, which may allow the same performance (in terms of number of $2\pi$ phase errors) to be obtained from a significantly further distance into the sensing fibre (in some systems of the order of several kilometres) without the additional time-domain filtering.

In some applications the signals of interest may be relatively low frequency, and thus limiting the bandwidth for the measurement signal may allow for more reliable detection of the signals of interest over a longer range.

FIG. 3 illustrates the processing that may be applied according to an embodiment. The processing may involve a number of similar stages as described with reference to FIG. 2, which are identified by similar reference numerals. These processing stages may operate in substantially the same way as described previously.

Thus, as described above, the data in the different polarisation channels may be split 201 and separately converted to baseband 202 for each of the carrier frequencies, e.g. by multiplying the relevant digital signal by cos and sin terms at the relevant carrier frequency to provide respective I and Q components.

The processing illustrated in FIG. 3 applies additional time-domain filter 301 to the baseband signals, e.g. the I and Q components, to provide low-pass filtering with a cut-off frequency which is lower than half the ping rate prior to conversion to phase 206. The cut-off frequency for the filtering 301 may be pre-determined and, in some cases could be fixed, for instance based on the expected frequency of signals of interest and/or a desired error threshold for a number of phase errors up to a certain sensing range. In some implementations the cut-off frequency could be configured in use, e.g. specified by an operator of the sensor via a suitable user interface and in some implementations the cut-off frequency may be reconfigurable or dynamically variable in use.

FIG. 3 illustrates that the filtering 301 may be implemented prior to determining the absolute phase 206 using the baseband signals after decimation 205. The additional filtering 301 thus could be performed after the baseband signals have been low-pass filtered 203 and then summed with a moving average over half the pulse width 204 as with the processing of FIG. 2. It will be understood that the purpose of filtering 203 is to remove unwanted signal components that don't correspond to the baseband signal at the relevant carrier frequency, i.e. that arise from backscatter of the other pulse of the interrogation, and the moving average over half the pulse width is based on the minimal spatial resolution, so neither of these stages of the known processing are concerned with limiting the signal bandwidth.

The additional filtering could be performed by forming a time series of the I and Q values, by concatenating the data on each channel from successive interrogations, and then low pass filtering the formed time series. However, to avoid the need for memory to maintain such a time series, in some implementations the time series may not be formed as such. The filtering may be applied in a number of ways, as would be understood by one skilled in the art. In general a filter, which may for example comprise a suitable IIR or FIR filter, may receive the relevant baseband signals and provide appropriate filtering. The baseband signals may be filtered in filter channels corresponding to sensing portions of the sensing fibre based on the desired gauge length, and thus the filtering could be implemented by a multichannel filter.

The filtered I and Q values may then be converted 206 to phase, and optionally amplitude, values in a similar manner as discussed with respect to FIG. 2, i.e. used to determine the absolute angle and optionally magnitude of the complex phasor, and the determined phase values may be processed in the same way as discussed with reference to FIG. 2, e.g. to determine a spatial differential of phase 207 for a desired gauge length, to determine a temporal difference 208 for the sub-samples of a given interrogation and then integrate/scale 209 the resultant measurement signal accordingly with polarisation diversity processing 210.

The distributed fibre optic sensing enabled by the processing of embodiments of the present disclosure thus provides the same general advantages as described in WO2020/016556, e.g. of a quantitative determination of a stimulus acting on a sensing portion of a sensing optical fibre which is operable over long lengths, but allow for signal bandwidth to be reduced, with a consequent extension in range at which a certain number of phase errors may be expected. For long range operation, where the signals of interest are relatively low frequency, the processing enabled by embodiments of the present disclosure can thus improve error performance.

In some implementations the processor 110 may be operable so that the additional time domain filtering 301 may dynamically applied or not in use. In other words, the processor may be configured to be selectively operable to process the data with or without time domain filtering to limit the signal bandwidth. The processor 110 may thus be operable in a first mode to process the received data according to the known processing as illustrated in FIG. 2, or in a second mode to process the data with time domain filtering to limit the signal bandwidth, i.e. to process the received data according to the processing as illustrated in FIG. 3. The processor 101 may, for example, swap between the modes of operation base as controlled by an operator and/or based on events. For instance the processor could operate in the second mode, which provides more reliable longer-range monitoring, until an event of interest is detected. If the event occurs in a part of the sensing fibre which is relatively close to the launch end of the fibre, i.e. the range to the sensing portions that are detecting the event of interest is relatively low, the processor may swap to the first mode of operation to provide a higher signal bandwidth for monitoring the event of interest.

It would also be possible to operate in different modes for different sections of the fibre. For example, for sections of the sensing fibre that are nearer to the launch end, with a good carrier to noise ratio, the relevant processing may be operated in the first mode to enable the maximum frequency response, while the processing for more distant sections is operated in the second mode to reduce the number of phase errors.

The embodiments discussed above contemplate that each interrogation may comprise two pulses with a frequency difference between the pulses which is sufficient to allow independent demodulation. The time-domain filtering is applied to separately to each independent baseband signal (and separately to each polarisation channel if present), prior to conversion to phase and any subsequent processing, e.g. integration and/or diversity processing. However it will be understood that the principles, are also applicable to similar techniques in which each interrogation comprises a different number of pulses, including just a single pulse. In general, therefore, the time-domain filtering, in the time domain corresponding to repeated interrogations, may be applied to any independent baseband signal component from successive interrogations, whatever the form of interrogation.

The embodiments discussed above also contemplate that each interrogation launches one or more pulses at fixed frequency. However the principles of the present disclosure could also be applied to systems in which interrogations comprise different pulse types, such as one or more pulses with a time-varying frequency pattern, e.g. chirped pulses or the like. In such cases the additional time-domain filtering step could still be beneficially applied, although the steps to obtain the relevant I and Q values for each portion of the sensing fibre from the successive interrogations would be different, as would be understood by those skilled in the art, for instance employing some form of matched filtering.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A distributed fibre optic sensing apparatus, comprising:
an optical arrangement configured to generate a local oscillator signal and also to repeatedly interrogate a sensing optical fibre with interrogations of coherent optical radiation at an interrogation rate, wherein each interrogation comprises at least one optical pulse, the or each optical pulse being at a respective launch frequency which differs from a frequency of the local oscillator signal by an amount equal to a respective carrier frequency;
a mixer configured to receive a backscatter signal comprising radiation from the optical pulse which is back-scattered from within the sensing optical fibre and to mix the backscatter signal with the local oscillator signal;

a detector arrangement configured to receive the backscatter signal mixed with the local oscillator signal and provide a first corresponding digital detector output signal; and a processor configured to process the first digital detector output signal:

wherein the processor is configured, for the or each respective carrier frequency, to down-convert the digital detector output signal to a respective baseband signal based on that carrier frequency and convert the baseband signal to a phase signal; and wherein the processor is operable to apply time-domain low pass filtering to the or each baseband signal with a first cut-off frequency which is less than half the interrogation rate.

2. The distributed fibre optic sensing apparatus of claim 1 wherein the processor is configured to down-convert the first digital detector output signal to the respective baseband signal by multiplying the digital detector output signal by sine and cosine components at the respective carrier frequency to provide in-phase and quadrature components of the baseband signal and wherein the processor is operable to apply said time-domain low pass filtering to the in-phase and quadrature components of the respective baseband signal.

3. The distributed fibre optic sensing apparatus of claim 2 wherein the processor is configured to apply said time-domain low pass filtering by forming a time series of the in-phase and quadrature components of the baseband signal and filtering said time series.

4. The distributed fibre optic sensing apparatus of claim 1 wherein the processor is configured to sum the or each respective baseband signal over a distance corresponding to half a length of the at least one interrogation pulse in the sensing optical fibre prior to conversion to the phase signal.

5. The distributed fibre optic sensing apparatus of claim 4 wherein the processor is configured such that said time-domain low pass filtering of the respective baseband signal is applied to the respective baseband signal after said summing.

6. The distributed fibre optic sensing apparatus of claim 1 wherein said at least one optical pulse comprises a first optical pulse at a first launch frequency which differs from the frequency of the local oscillator signal by a first carrier frequency and a second launch pulse at a second, different launch frequency which differs from the frequency of the local oscillator signal by a second carrier frequency.

7. The distributed fibre optic sensing apparatus of claim 6 wherein the processor is configured to down-convert the first digital detector output signal to a first baseband signal by multiplying the digital detector output signal by sine and cosine components at the first carrier frequency to provide in-phase and quadrature components of the first baseband signal and to down-convert the digital detector output signal to a second baseband signal by multiplying the digital detector output signal by sine and cosine components at the second carrier frequency to provide in-phase and quadrature components of the second baseband signal and wherein the processor is operable to apply said time-domain low pass filtering to the in-phase and quadrature components of the first and second baseband signals prior to conversion to first and second phase signals.

8. The distributed fibre optic sensing apparatus of claim 7, wherein the processor is configured such that down-converting the digital detector output signal to the first baseband signal comprises additionally filtering the down-converted digital detector output signal so as to remove substantially any signal components arising from backscatter from the second optical pulse and down-converting the digital detector output signal to the second baseband signal comprises additionally filtering the down-converted digital detector output signal so as to remove substantially any signal components arising from backscatter from the first optical pulse.

9. The distributed fibre optic sensing apparatus of claim 7 wherein the processor is configured to determine, for each of a plurality of sensing portions, first and second spatial phase values as the differential change in phase of the respective first and second phase signals over said sensing portion.

10. The distributed fibre optic sensing apparatus of claim 9 wherein the processor is further configured, for said sensing portions, to determine a temporal difference value as a difference between the first spatial phase value and the second spatial phase value.

11. The distributed fibre optic sensing apparatus of claim 10 wherein the processor is further configured to integrate the determined temporal difference value over time with a scaling factor based on a time delay between the first and second optical pulses as a fraction of an interrogation period between successive interrogations to provide a scaled phase signal.

12. The distributed fibre optic sensing apparatus of claim 11 wherein the processor is further configured to output a measurement signal based on the scaled phase signal.

13. The distributed fibre optic sensing apparatus of claim 6 wherein the first launch frequency differs from the second launch frequency by at least 100 MHz.

14. The distributed fibre optic sensing apparatus of claim 6 wherein the first launch frequency and the second launch frequency each differ from the frequency of the local oscillator signal by at least 200 MHz.

15. The distributed fibre optic sensing apparatus of claim 1 wherein:

the mixer is further configured to split the backscatter signal into first and second orthogonal polarisation components and to mix each of the first and second polarisation components with a corresponding part of the local oscillator signal to form respective first and second mixed signals;

wherein the detector arrangement is configured to receive the first and second mixed signals and to provide said first digital detector output signal corresponding the first mixed signal and also a second digital detector output signal corresponding the first mixed signal; and the processor is configured to process the second digital detector output signal in the same way as the first digital detector output signal.

16. The distributed fibre optic sensing apparatus of claim 15 wherein the processor is configured to combine data generated from processing the first digital detector output signal and data generated from processing the second digital detector output signal according to a quality metric.

17. The distributed fibre optic sensing apparatus of claim 1 further comprising a sensing optical fibre coupled to receive the interrogations of coherent optical radiation from the optical arrangement and to provide the backscatter signal to the mixer.

18. A method of processing data acquired from a distributed fibre optic sensing apparatus wherein the data comprises:

a digital detector output signal from a detector that received a local oscillator signal mixed with backscatter from a sensing optical fibre in response to repeated interrogations of the sensing optical fibre, where each interrogation comprises at least one optical pulse at a respective launch frequency which differs from a frequency of the local oscillator signal by an amount equal to a respective carrier frequency;

the method comprising:

for the or each respective carrier frequency, down-converting the digital detector output signal to a baseband signal based on the respective carrier frequency and converting the baseband signal to a phase signal;

wherein the method comprises applying time-domain low pass filtering to the or each baseband signal with a first cut-off of frequency which is less than half the interrogation rate.

19. The method of claim 18 wherein the at least one optical pulse comprises a first optical pulse at a first launch frequency which differs from the frequency of the local oscillator signal by a first carrier frequency and a second launch pulse at a second, different launch frequency which differs from the frequency of the local oscillator signal by a second carrier frequency.

20. The method of claim 19 wherein down-converting the digital detector output signal to the first baseband signal comprises additionally filtering the down-converted digital detector output signal so as to remove substantially any signal components arising from backscatter from the second optical pulse and down-converting the digital detector output signal to the second baseband signal comprises additionally filtering the down-converted digital detector output signal so as to remove substantially any signal components arising from backscatter from the first optical pulse.

* * * * *